United States Patent
Shmueli

(10) Patent No.: US 10,423,891 B2
(45) Date of Patent: Sep. 24, 2019

(54) SYSTEM, METHOD, AND RECORDING MEDIUM FOR VECTOR REPRESENTATION OF WORDS IN A LANGUAGE

(71) Applicant: International Business Machines Corporation, Armonk, NY (US)

(72) Inventor: Oded Shmueli, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 690 days.

(21) Appl. No.: 14/886,167

(22) Filed: Oct. 19, 2015

(65) Prior Publication Data

US 2017/0109648 A1 Apr. 20, 2017

(51) Int. Cl.
*G06F 17/27* (2006.01)
*G06N 20/00* (2019.01)

(52) U.S. Cl.
CPC ......... *G06N 20/00* (2019.01); *G06F 17/2785* (2013.01)

(58) Field of Classification Search
CPC ....... G06F 19/10–28; G06F 19/70–709; G06F 15/00–76; G06F 2015/761–768; G06F 5/048; G06F 7/04; G06F 99/005; G06F 17/2785; G06F 5/04
See application file for complete search history.

(56) References Cited

U.S. PATENT DOCUMENTS

| | | | |
|---|---|---|---|
| 5,873,056 A | 2/1999 | Liddy et al. | |
| 8,924,391 B2 | 12/2014 | Johnston et al. | |
| 9,672,207 B2* | 6/2017 | Shmueli | G06F 16/355 |
| 9,798,818 B2* | 10/2017 | Ho | G06F 16/9535 |
| 10,025,773 B2* | 7/2018 | Bordawekar | G06F 17/276 |
| 10,102,294 B2* | 10/2018 | Ho | G06F 16/9535 |
| 10,147,036 B2* | 12/2018 | Ho | G06F 16/9535 |
| 10,152,550 B2* | 12/2018 | Ho | G06F 16/9535 |

(Continued)

FOREIGN PATENT DOCUMENTS

JP 2007/317132 A 12/2007

OTHER PUBLICATIONS

IEEE Fuzzy logic based sentiment analysis of product review documents, K Indhuja; Raj P C Reghu Published in: 2014 First International Conference on Computational Systems and Communications (ICCSC) Date of Conference: Dec. 17-18, 2014 pp. 18-22.*

(Continued)

*Primary Examiner* — Michael B Holmes
(74) *Attorney, Agent, or Firm* — Rahan Uddin, Esq.; McGinn IP Law Group, PLLC

(57) ABSTRACT

A method, system, and non-transitory compute readable medium for vector representation of a sequence of items, including receiving a sequence of items from a source, producing a first distributed representation for each item of the sequence, wherein the distributed representation comprises a word vector and a class vector, partitioning the sequence of items into classes, and training the received sequence using the first distributed representation, such that a new distributed representation is produced for which the vector entries of the new distributed representation are amplified when the vector entries of each item correspond to a class of an item to be explained and fractionalizing vector entries of each item that do not correspond to the class of the item to be explained.

19 Claims, 12 Drawing Sheets

(56) References Cited

U.S. PATENT DOCUMENTS

| | | |
|---|---|---|
| 10,217,053 B2 * | 2/2019 | Bordawekar .......... G06N 7/005 |
| 2007/0106657 A1 | 5/2007 | Brzeski et al. |
| 2013/0006636 A1 | 1/2013 | Mizuguchi et al. |
| 2013/0204885 A1 | 8/2013 | Clinchant et al. |
| 2014/0278359 A1 | 9/2014 | Speer et al. |
| 2015/0248608 A1 | 9/2015 | Higgins et al. |

OTHER PUBLICATIONS

Semi-supervised learning for automatic conceptual property extraction, Colin Kelly, Barry Devereux, Anna Korhonen Published in: Proceeding CMCL '12 Proceedings of the 3rd Workshop on Cognitive Modeling and Computational Linguistics pp. 11-20, Jun. 2012.*

ACM Digital Library Co-clustering documents and words using bipartite spectral graph partitioning Inderjit S. Dhillon Proceeding KDD '01 Proceedings of the seventh ACM SIGKDD international conference on Knowledge discovery and data mining pp. 269-274 Aug. 2001.*

Reisinger et al.; "Multi-prototype vector-space models of word meaning"; Publication Ttl: NAACL HLT 2010—Human Language Technologies: The 2010 Annual Conference of the North American Chapter of the Association for Computational Linguistics, Proceedings of the Main Conference, pp. 109-117; 2010; Publisher: Association for Computational Linguistics (ACL); Country of Publication: USA; ISBN: 1932432655, 9781932432657; Database: Ei Compendex.

* cited by examiner

VECTOR REPRESENTATION METHOD 500

VECTOR REPRESENTATION METHOD 600

VECTOR REPRESENTATION METHOD 700

VECTOR REPRESENTATION METHOD 800

Fig. 12 physics class= 137 vector dimensions in absolute value sorted order ( 259 ) -7.044309 ( 426 ) -5.406774 ( 137 ) 5.289648 ( 17 ) -4.652148

NEG GRP DIM 259 (186 experiments 0.435546) (1347 scientists 0.372878) (4178 research 0.334957) (106 genetics 0.422284) (1620 researchers 0.271391) (345 samples 0.141213)

NEG GRP DIM 426 (116 planets 0.254455) (158 telescope 0.278366) (1075 earth 0.261717) (264 mars 0.211389) (583 planet 0.200521) (269 universe 0.425874)

POS GRP DIM 137 (101 beam 0.233258) (124 magnetic 0.311789) (136 particles 0.339205) (232 cure 0.055084) (178 physics 1.000000) (238 radiation 0.262125) (158 telescope 0.278366)

NEG GRP DIM 17 (252 genes 0.139339) (340 gene 0.106409) (756 cells 0.131188) (229 protein 0.153299) (391 genetic 0.176479) (192 mice 0.149479)

SYSTEM, METHOD, AND RECORDING MEDIUM FOR VECTOR REPRESENTATION OF WORDS IN A LANGUAGE

BACKGROUND

The present invention relates generally to vector representation of words, and more generally items, in a language, and more particularly, but not by way of limitation, to an unsupervised and non-dictionary based vector representation system, method, and recording medium for aiding in understanding the meaning of word vector entries.

Conventional distributed vector representations of words have proven useful in applications such as solving analogy problems. Despite many usages suggested for word vectors, their internal structure remains opaque. That it, the conventional distributed vector representations do not make it possible to assign meaning to the dimensions of the vectors.

For example, one conventional distributed vector representation has attempted to train and obtain 200 dimensions vectors for English words. Then, the convention technique has tried to solve an analogy problem such as "king to man is like what to woman" by finding a closest vector to that of $V_{king}-V_{man}+V_{woman}$ (i.e., $V_{queen}$).

However, the conventional distributed vector representations do not identify in each of these 200 dimensions $V_{king}$ with clear properties such as status, gender, nationality, age, weight, hunting ability, historical period etc.

That is, there is a technical problem in the conventional distributed vector representation systems that they provide no capabilities to decode properties with words because the vector dimensions of the words have no clear semantic meaning. Accordingly, even when there is a dominant dimension (large absolute value) for a word vector, the intensity of the word on the particular dominant dimension has no apparent meaning.

SUMMARY

In an exemplary embodiment, the present invention can provide a method for vector representation of a sequence of items, the method including receiving a sequence of items from a source, producing a first distributed representation for each item of the sequence, wherein the distributed representation comprises a word vector and a class vector, partitioning the sequence of items into classes, and training the received sequence using the first distributed representation, such that a new distributed representation is produced for which the vector entries of the new distributed representation are amplified when the vector entries of each item correspond to a class of an item to be explained and fractionalizing vector entries of each item that do not correspond to the class of the item to be explained.

Further, in another exemplary embodiment, the present invention can provide a non-transitory computer-readable recording medium recording a vector representation program for vector representation of a sequence of items, the program causing a computer to perform: receiving a sequence of items from a source, producing a first distributed representation for each item of the sequence, wherein the distributed representation comprises a word vector and a class vector, partitioning the sequence of items into classes, and training the received sequence using the first distributed representation, such that a new distributed representation is produced for which the vector entries of the new distributed representation are amplified when the vector entries of each item correspond to a class of an item to be explained and fractionalizing vector entries of each item that do not correspond to the class of the item to be explained.

Even further, in another exemplary embodiment, the present invention can provide a vector representation system for vector representation of a sequence of items, the system receiving the sequence of items from a source, the system including a first distributed representation device configured to produce a first distributed representation for each item of the sequence, the distributed representation including a word vector and a class vector, a first partitioning device configured to partition the sequence of items into classes, and a first training device configured to train the received sequence using the first distributed representation, such that a new distributed representation is produced for which the vector entries of the new distributed representation are amplified when the vector entries of each item correspond to a class of an item to be explained and fractionalizing vector entries of each item that do not correspond to the class of the item to be explained.

There has thus been outlined, rather broadly, an embodiment of the invention in order that the detailed description thereof may be better understood, and in order that the present contribution to the art may be better appreciated. There are, of course, additional exemplary embodiments of the invention that will be described below and which will form the subject matter of the claims appended hereto.

It is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The exemplary aspects of the invention will be better understood from the following detailed description of the exemplary embodiments of the invention with reference to the drawings.

FIG. 12 exemplary shows an output of the vector representation system 300.

DETAILED DESCRIPTION

Figure 1:
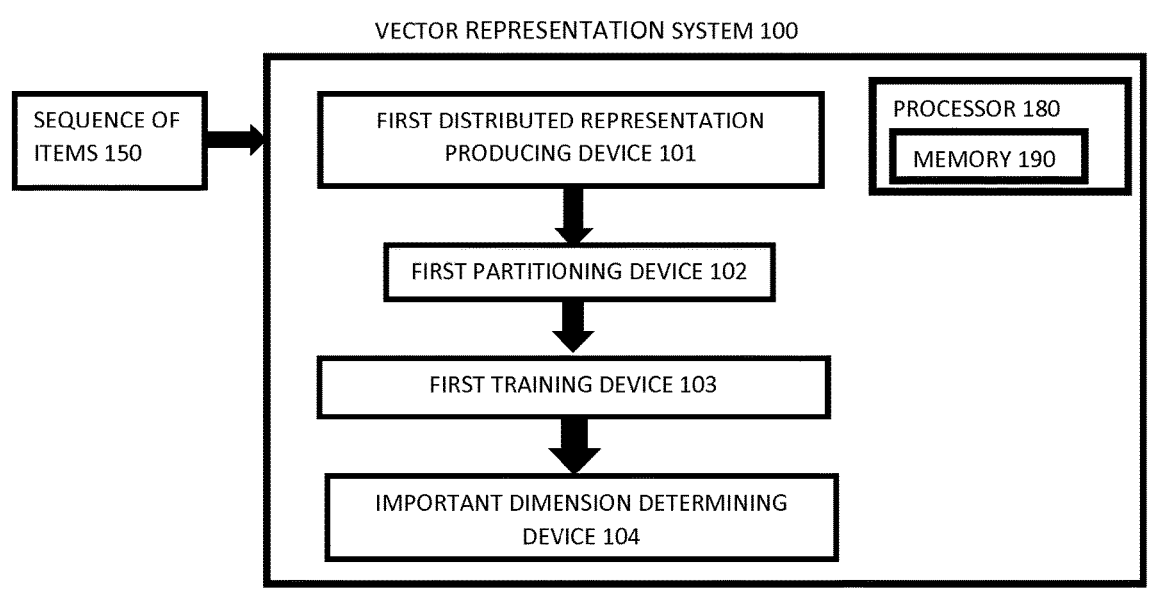
FIG. 1 exemplarily shows a block diagram illustrating a configuration of a vector representation system 100.

The invention will now be described with reference to FIGS. 1-12, in which like reference numerals refer to like parts throughout. It is emphasized that, according to common practice, the various features of the drawing are not necessary to scale. On the contrary, the dimensions of the various features can be arbitrarily expanded or reduced for clarity. Exemplary embodiments are provided below for illustration purposes and do not limit the claims.

With reference now to FIG. 1, the vector representation system 100 includes a first distributed representation device 101, a first partitioning device 102, a first training device 103, and an important dimension determining device 104. The vector representation system 100 receives a sequence of items 150 as an input. It should be noted that "items" is intended to mean words, but is not limited thereto as any sequence of items can be input into the vector representation system 100. The vector representation system 100 includes a processor 180 and a memory 190, with the memory 190 storing instructions to cause the processor 180 to execute each device of the vector representation system 100.

Figure 9:
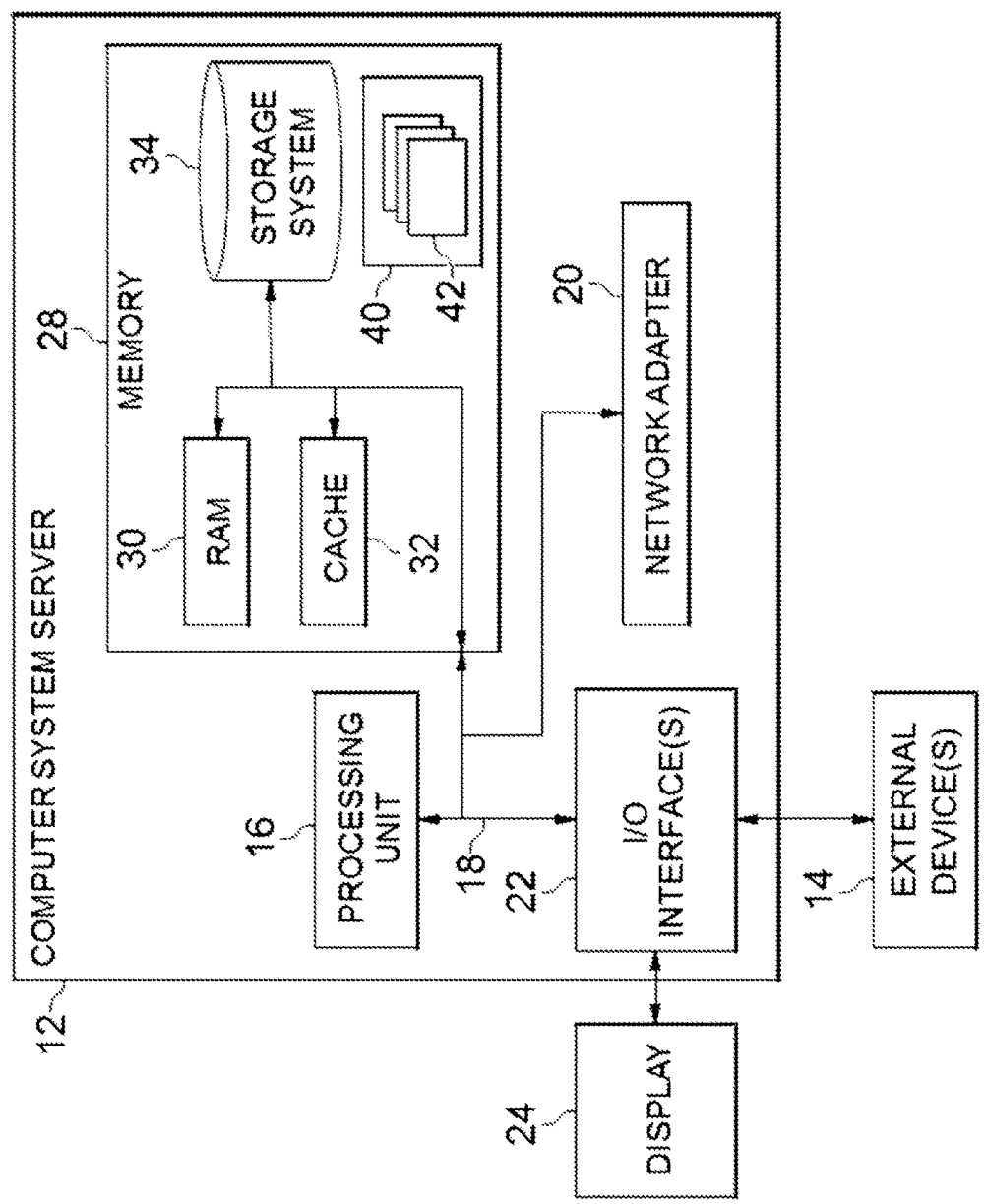
FIG. 9 depicts a cloud computing node according to an embodiment of the present invention.
Figure 10:
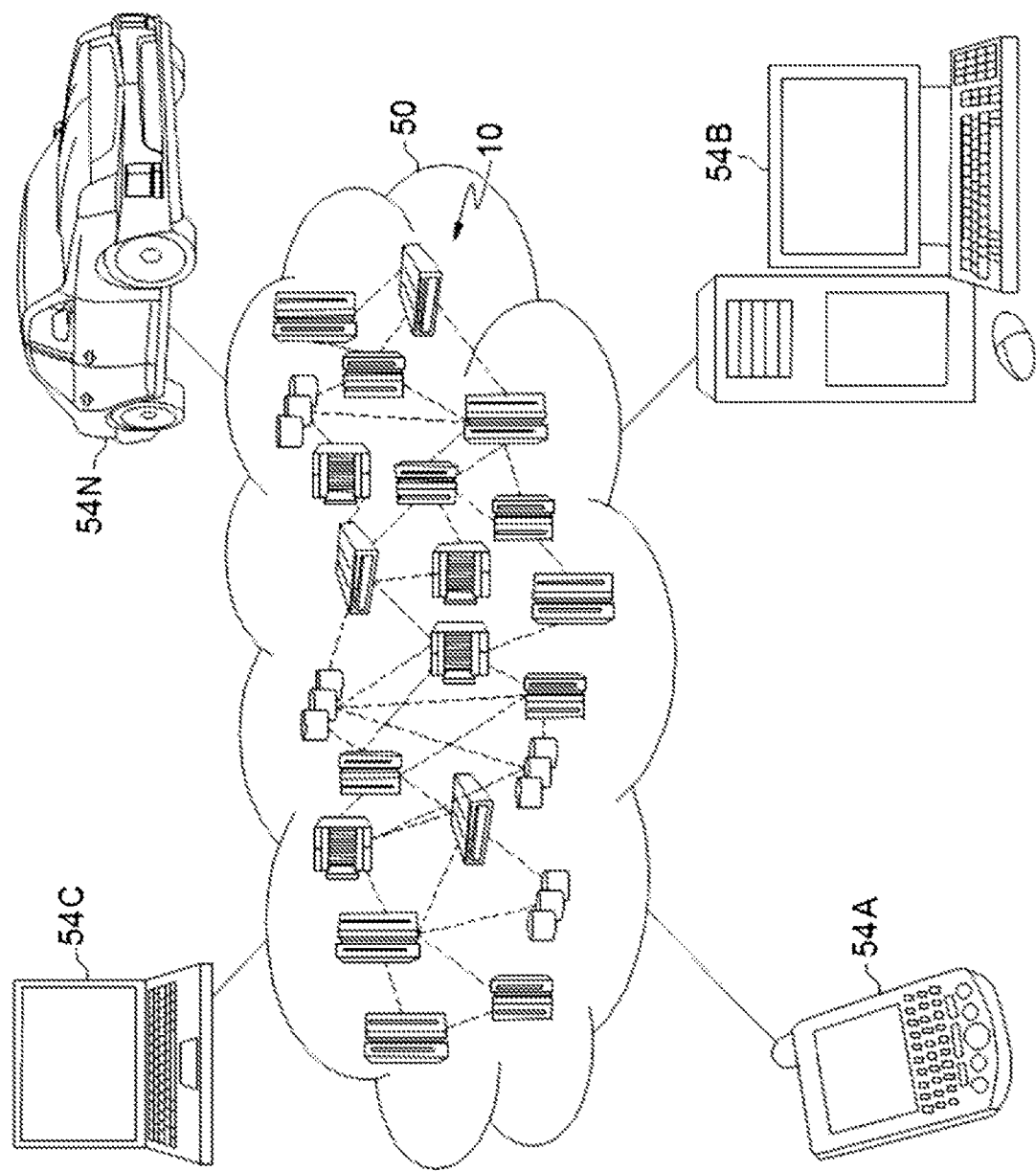
FIG. 10 depicts a cloud computing environment according to another embodiment of the present invention.
Figure 11:
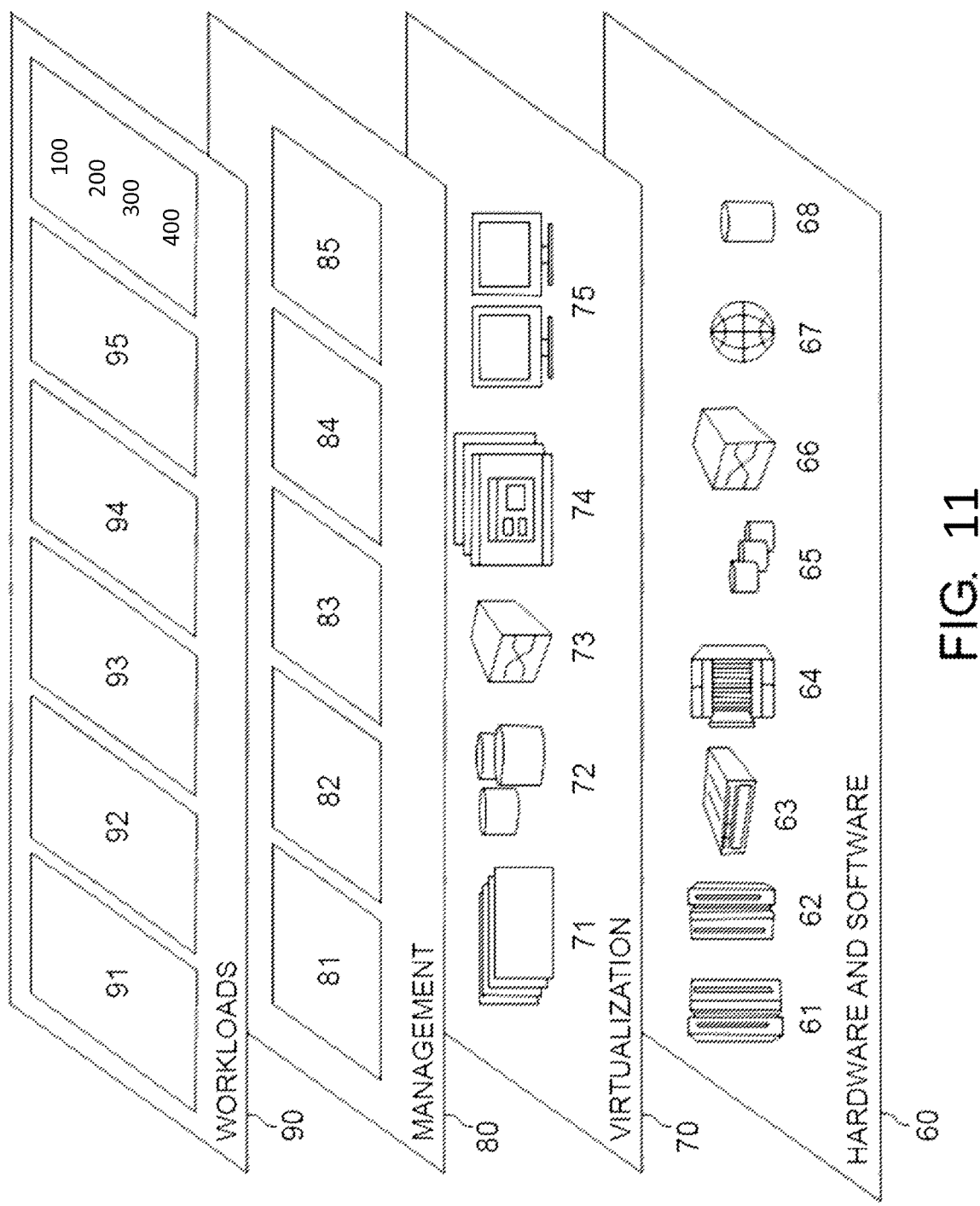
FIG. 11 depicts abstraction model layers according to an embodiment of the present invention.

Although as shown in FIGS. 9-11 and as described later, the computer system/server 12 is exemplarily shown in cloud computing node 10 as a general-purpose computing device which may execute in a layer the vector representation systems 100, 200, 300, and 400 (FIG. 11), it is noted that the present invention can be implemented outside of the cloud environment.

The distributed representation device 101 receives the sequence of items 150 from a source (i.e., a webpage, a textbook, a pdf, Wikipedia™, etc.) and produces a distributed representation for each item "w", a word vector and a context vector. That is, the distributed representation device 101 uses a vector producing algorithm such as word2vec (w2v) or Glove, and produces output vectors of two types per each item: word (Syn0 type in w2v) and context (Syn1neg in w2v)). More specifically, given a sequence of items (words, concepts, nodes in a graph, etc. or a combination thereof), the distributed representation device 101 learns a distributed representation (i.e. vectors) of dimension n (n is a parameter), using a tool such as word2vec or Glove.

The first partitioning device 102 partitions the items into classes. For each class "C", the first partitioning device 102 keeps a word representative vector "c" and a context representative vector "c". The numbering of the classes that the partitioning device 102 partitions the items into is C1 to Cm, where m is the number of classes. Generally, the first partitioning device 102 partitions the items into, for example, 200 classes, but the first partitioning device 102 can partition the items into any number of classes that a user specifies.

More specifically, the first partitioning device 102 partitions the items into a number "m" of classes using the word vectors by using, for example, K-means clustering, but any suitable vector clustering methods can be used. Each class is a set of items and classes are numbered arbitrarily as C1 to Cm. The union of the classes is the whole collection of items or a subset of interest thereof. If an item "w" belongs to class Ci, the primary dimension of item "w" is "i".

That is, the first partitioning device 102 forms "m" classes C1 to Cm, each class being a set of items. The union of the classes is the whole vocabulary or a portion thereof of interest. Class forming is done by the first partitioning device 102 based on the distributed representation, for example, by applying a clustering algorithm to the word vectors. The clustering algorithm may be modified, for example, to give more weight to certain items based on their number of occurrences in the sequence, e.g., by multiplying their vectors by log (number of occurrences).

The first training device 103 trains again, in a manner to be described, from scratch on the input sequence where the newly learned vectors are of dimension "m", the number of classes. In this way, each dimension uniquely corresponds to a class. The first training device 103 produces a new distributed representation by, during training, amplifying, i.e., multiplying by a factor bigger than one, the changes to vector entries whose dimensions correspond to the class of the item whose vector is being modified, and fractionalizing, i.e. multiplying by a factor bigger than zero and less than one, those that do not.

For each change to a vector entry "j" corresponding to a class Cj to which the item belongs, "j" is the primary dimension of the item, the first training device 103 amplifies the usual change by a factor of θ (e.g., 2). For other entries, amplify (fractionalize) by a factor θ' (e.g. 0.5, namely, reduce). The factors can be dynamic or pre-set factors decided by the user.

For example, in word2vec, this implies that the change induced by the computed gradient is amplified by either 2 or 0.5 by the first training device 103 depending on the specific entry in the vectors (both word vectors, Syn0 in w2v, and context vectors, Syn1neg in w2v).

In this manner, the expected, and experimentally observed results, are that the primary dimension entry for an item is strengthened in terms of absolute value (become larger if positive and smaller if negative) and is one of the dominant dimensions of the learned word vector of that item.

It should be noted that the amplification can be done in a plurality of ways. For example, in Glove and similar optimization schemes, such as that of Arora that use AdaGrad, when examining a (stochastically obtained) example ($X_{uv}$, the co-occurrence weighted count of items u and v in the corpus), the gradient is computed for this example and the changes are performed according to $w_j = w_j - (\eta g_j) = sqrt(G_{jj})$ where $w_j$ is the j'th adjustable parameter of the function being minimized, $g_j$ is the j'th component of the gradient computed based on this example, _ is the global learning rate, $G_{jj}$ is a scalar computed based on the gradients computed on all the examples seen till now. Here each word and context vector v corresponds to a collection $w_{v1}$ to $w_{vm}$ of $w_j$ parameters. Denote the primary dimension of vector v by vd. Then, when updating the $w_j$ parameter corresponding to $w_{vvd}$, this change is amplified by a factor and reduced by a second factor for other $w_j$ parameters. The particular values of the first factor and the second factor may differ between learning methods and corpora.

In addition, the resulting vectors from the first training device 103 have a strong 'accent' on a few dominant dimensions, which may be positive or negative. Generally, the dominant dimensions have higher (absolute) entry values in comparison to other entries (for non-primary dimensions).

It is noted that the quality of the resulting vectors in terms of solving analogies is almost as good as that of ordinary non-amplifying training. By increasing the number of training iterations, one can obtain vector quality as that of the standard learning. At end of training, the primary dimension is either the dominant dimension, or one of a few dominant dimensions, in the vector representing the item.

As exemplary shown in TABLE 1 below, the distributed representation device 101 produces word vectors, followed by class construction of 200 classes using K-means clustering by the first partitioning device 102, and then training by the first training device 103 using the method of amplifying the dimension corresponding to the item's class and reducing for other dimensions. For the 200 vector entries for the item "ship" (i.e., an item to be explained), belonging to class 184, D=4 (the number of important dimensions, a parameter for device 104), dominant dimensions: 184, 195, 104 and 73 (in bold), trained in two phases on file text8, included in the word2vec package, using word2vec. The primary dimension is 184.

TABLE 1

| ship class = 184 | 0) 1.717653 | 1) −0.082886 | 2) −0.919800 |
|---|---|---|---|
| 3) −0.195107 | 4) −0.768419 | 5) 0.273024 | 6) 0.318056 |
| 7) −3.611123 | 8) 0.500214 | 9) −0.003959 | 10) −0.753774 |
| 11) 2.082181 | 12) 0.273558 | 13) 1.954590 | 14) −1.945022 |
| 15) 1.029281 | 16) 0.262146 | 17) 1.279858 | 18) −0.671832 |
| 19) −0.386529 | 20) 1.091287 | 21) 1.717568 | 22) 0.077292 |
| 23) 1.371427 | 24) −0.565779 | 25) −0.729907 | 26) 2.401361 |
| 27) −0.028002 | 28) 0.072387 | 29) 0.674132 | 30) −1.557562 |
| 31) −1.530595 | 32) −0.455933 | 33) 0.659376 | 34) −0.410236 |
| 35) 1.146831 | 36) −1.676436 | 37) −1.419122 | 38) −0.319742 |
| 39) 2.103853 | 40) 1.087506 | 41) −1.882318 | 42) 1.787644 |
| 43) 1.134517 | 44) 0.843407 | 45) −0.264209 | 46) −0.952413 |
| 47) 0.140217 | 48) 1.384722 | 49) 1.017501 | 50) 1.693972 |
| 51) 0.162650 | 52) 3.093643 | 53) −0.088908 | 54) −1.010043 |
| 55) −0.693582 | 56) 0.248035 | 57) −0.139664 | 58) 0.100200 |
| 59) 2.112705 | 60) 2.154412 | 61) 0.605940 | 62) −0.248224 |
| 63) 0.250957 | 64) −0.155719 | 65) 0.339117 | 66) 0.766020 |
| 67) −0.878556 | 68) −0.749894 | 69) −0.047557 | 70) −0.800627 |
| 71) −0.937667 | 72) 0.451169 | 73) −3.587902 | 74) −0.146626 |
| 75) −1.470829 | 76) −0.986446 | 77) −0.016721 | 78) −2.488092 |
| 79) 1.155357 | 80) 1.503805 | 81) 1.820203 | 82) −1.814887 |
| 83) 1.004959 | 84) −1.784473 | 85) −1.389628 | 86) 0.198362 |
| 87) −0.019554 | 88) −0.771102 | 89) 1.123651 | 90) −0.256643 |
| 91) 0.473266 | 92) −0.801692 | 93) −0.838944 | 94) 0.829134 |
| 95) 1.858548 | 96) −0.152420 | 97) −0.347741 | 98) 0.335627 |
| 99) 0.048395 | 100) 1.044866 | 101) −1.289629 | 102) 0.587046 |
| 103) −2.413552 | 104) 4.169171 | 105) 1.339476 | 106) 0.238343 |
| 107) 0.492756 | 108) 1.499760 | 109) 0.308850 | 110) 0.245016 |
| 111) −1.260388 | 112) −0.436170 | 113) −0.628838 | 114) 0.720850 |
| 115) −0.512956 | 116) −2.581596 | 117) 0.514678 | 118) 0.694672 |
| 119) −0.581201 | 120) −0.109980 | 121) −0.198008 | 122) −0.519106 |
| 123) −0.894939 | 124) −1.761736 | 125) 2.955631 | 126) −0.354922 |
| 127) −0.567906 | 128) −0.212316 | 129) 0.506116 | 130) 0.726293 |
| 131) 1.709202 | 132) 0.054978 | 133) −0.134424 | 134) −0.098233 |
| 135) 0.310265 | 136) −0.730275 | 137) 0.498941 | 138) 0.615469 |
| 139) 3.070399 | 140) 1.271634 | 141) −0.468188 | 142) −0.367860 |
| 143) −0.193053 | 144) 0.580324 | 145) 1.299899 | 146) 1.163576 |
| 147) −0.434311 | 148) −1.212320 | 149) 0.216358 | 150) 1.043249 |
| 151) 0.755731 | 152) 0.483588 | 153) −0.861412 | 154) −0.038773 |
| 155) 0.418897 | 156) −1.047932 | 157) 0.782067 | 158) −1.065745 |
| 159) −0.824589 | 160) −1.218495 | 161) −0.476229 | 162) 0.669269 |
| 163) −0.729160 | 164) 0.642702 | 165) 0.439694 | 166) 0.434300 |
| 167) −1.006111 | 168) 1.872874 | 169) −0.590775 | 170) −0.747695 |
| 171) 0.810593 | 172) −0.537842 | 173) 1.336711 | 174) −0.853074 |
| 175) −0.100862 | 176) 0.176998 | 177) −0.603602 | 178) 0.263404 |
| 179) −1.213197 | 180) 0.781155 | 181) 0.666371 | 182) −0.167628 |
| 183) −1.503648 | 184) −17.852692 | 185) 0.837615 | 186) 0.047964 |
| 187) −0.925075 | 188) −3.165870 | 189) 1.582163 | 190) 0.480024 |
| 191) −0.353494 | 192) −0.657356 | 193) −0.509624 | 194) −0.945679 |
| 195) 4.601085 | 196) 0.136243 | 197) −0.767606 | 198) −0.113009 |
| 199) 1.222248 | | | |

The important dimension determining device 104 outputs the positive (POS) and negative (NEG) items associated with the dominant dimensions. For example, the important dimension determining device 104 outputs the items associated with the dominant dimensions 184, 195, 104 and 73 for ship. The positive group dimensions of class 184 are output by the dimension determining device 104 and shown in TABLE 2 below and the negative group dimensions of class 184 are output by the dimension determining device 104 and shown in TABLE 3 below. Looking at the cell for 'neighbors', 141 is the number of input sequence occurrence and 0.194948 is the value of entry 184 in the word vector of 'neighbors'. The dominant/important dimensions are the largest values of the classes.

TABLE 2

| POS GRP | 141 | 237 | 119 | 324 | 680 |
|---|---|---|---|---|---|
| DIM 184 | neighbors | ash | alliances | Alberta | telephone |
| REP areas | 0.194948) | 0.193026) | 0.189432) | 0.182686) | 0.181203) |

TABLE 3

| NEG GRP DIM | 1548 ship | 1352 ships | 112 sinking | 180 sailing |
|---|---|---|---|---|
| 184 REP sloop | −0.723118) | −0.686075) | −0.677346) | −0.669472) |
| 267 hms | 106 destroyers | 171 battleship | 132 sunk | 133 submarines |
| −0.662021) | −0.650687) | −0.645629) | −0.644590) | −0.639237) |
| 168 sailors | 324 vessel | 182 battleships | 159 destroyer | 162 cruiser |
| −0.637603) | −0.635267) | −0.634921) | −0.626640) | −0.622835) |
| 373 submarine | 366 vessels | 770 fleet | 101 beatty | 113 torpedo |
| −0.603978) | −0.587481) | −0.585399) | −0.585172) | −0.574657) |
| 415 uss | 1599 navy | 301 boats | 137 cruisers | 187 hull |
| −0.571941) | −0.569659) | −0.563886) | −0.560273) | −0.559164) |
| 204 aboard | 483 admiral | 542 boat | 390 merchant | 208 sail |
| −0.552448) | −0.551520) | −0.549871) | −0.524371) | −0.522434) |
| 118 escort | 123 flagship | 941 naval | 117 dock | 635 carrier |
| −0.509201) | −0.495740) | −0.489590) | −0.487134) | −0.484253) |
| 340 carriers | 173 sailed | 113 admiralty | 101 whaling | 354 harbor |
| −0.481710) | −0.479479) | −0.451142) | −0.448721) | −0.446253) |
| 385 cargo | | | | |
| −0.433578) | | | | |

Since the dominant dimension 184 is negative, the positive group is not important for explaining ship as the dimension for class 184 is negative (−17.852692). Thus, the important dimension determining device 104 determines that only the negative terms are relevant to explaining "ship" as shown in TABLE 3.

After the first training device 103 produces the new distributed representation by amplifying positively the changes to vector dimensions corresponding to class of word and fractionally those that do not, each dimension i is associated with two sets of items Si1, Si2 corresponding to items that have a positive or a negative (including zero) value in the i'th dimension of their word vectors. The fact that the multiplication contributes to the cosine distance positively (+,+ or −,−) explains the appearance of the item in similar contexts as those of items in Si1 (for +) and Si2 (for −). The item will have a positive contribution to the dot product from items in the same group and negative contribution from the others.

Figure 2:
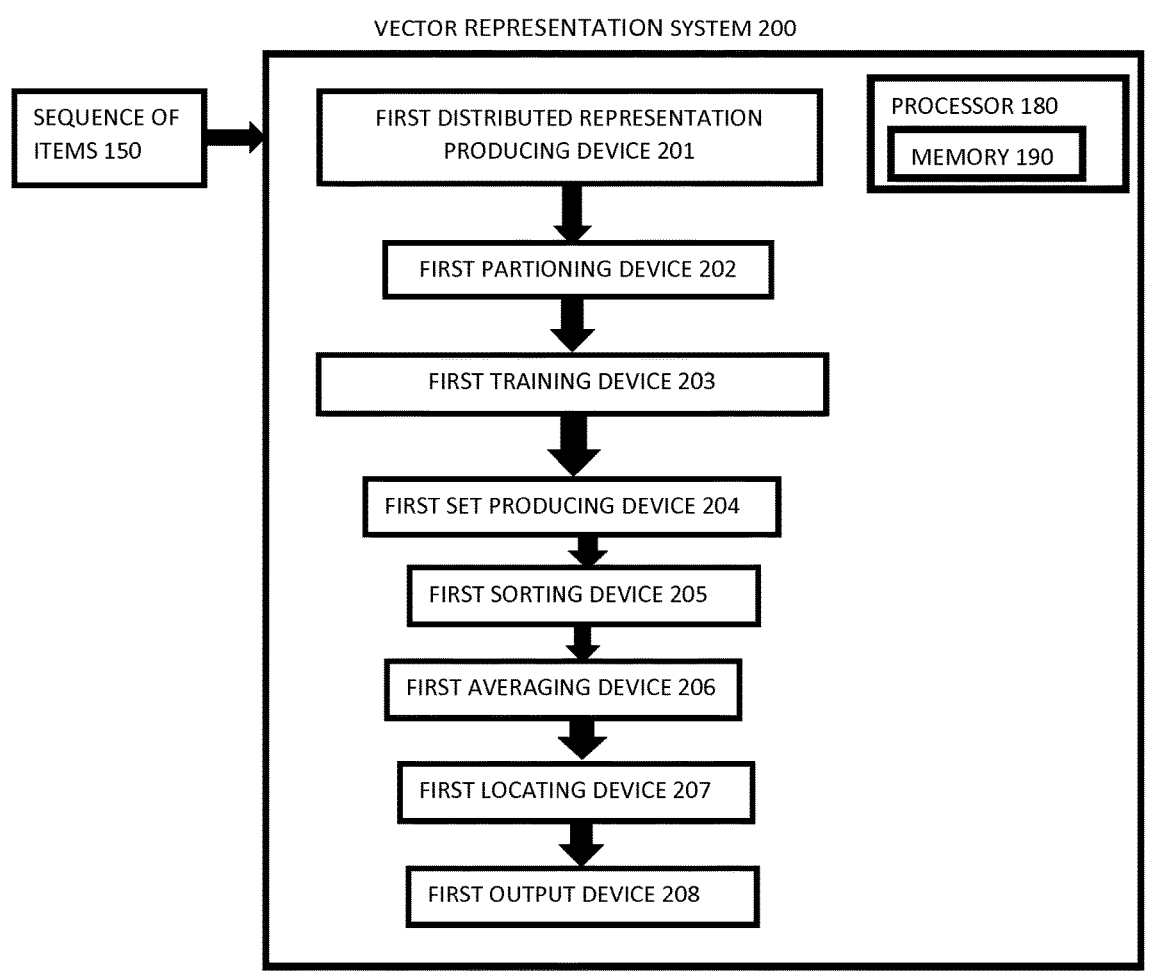
FIG. 2 exemplarily shows a block diagram illustrating a configuration of a vector representation system 200.

With reference now to FIG. 2, the vector representation system 200 includes a first distributed representation device 201, a first partitioning device 202, a first training device 203, a first set producing device 204, a first sorting device 205, a second averaging device 206, a first locating device 207, and a first output device 208. The vector representation system 200 receives a sequence of items 150 as an input. The vector representation system 200 includes a processor 180 and a memory 190, with the memory 190 storing instructions to cause the processor 180 to execute each device of the vector representation system 200.

The first distributed representation device 201, the first partitioning device 202, and the first training device 203 perform the same functions as their numerical counterparts in the vector representation system 100 described above.

The first set producing device 204, for each dimension "i", produces sets Ti1 and Ti2. Set Si1 is for vectors having positive vector entries in dimension i and set Si2 is for vectors having negative or zero vector entries in dimension i.

More specifically, this is to be done separately for each dimension and all vectors are normalized by dividing each word vector by its length.

The first sorting device 205 sorts all word vectors in Ti1 according to their entries value (+) in dimension "i"; then the first sorting device retains the first "L" vectors of (the highest "L" values) in the sort order ("L" is a parameter, e.g., 40) and the corresponding set of items is Si1.

The first average device 206 calculates the average vector for Si1 and normalizes it to have length 1, by summing up the word vectors of the items in Si1 and normalizing the resulting vector by dividing it by its length. The first average device 206 sets $AVG_{i1}$ be the resulting vector.

The first locating device 207 locates the vocabulary item "w" whose word vector is a cosine distance highest with $AVG_{i1}$. The item "w" represents Si1.

In other words, the first locating device 207 calculates the representative item and vector for Si1 by locating the item w in the vocabulary whose word vector vw (Syn0 type vector in w2v) has the highest cosine distance with $AVG_{i1}$.

The first set producing device 204, the first sorting device 205, the first average device 206, and the first locating device 207 similarly obtain Si2, $AVG_{i2}$ and a second word for the vectors having negative entries in dimension i, here device 205 sorts based on the absolute value of the (negative or zero) entries for dimension i.

The first output device outputs the representative item and the words of Si1 to explain dimension "i" for word context vectors with positive "i" entry values. This forms the POS group for dimension i. Similarly, the NEG group is formed and output for items with negative or zero entry for dimension "i".

As exemplary shown in TABLE 4 below, for the 200 vector entries for physics, belonging to class 172, D=4, dominant dimensions: 172, 174, 161, and 152 (in bold), trained in two phases on file text8 using word2vec. The primary dimension is 172.

TABLE 4

| physics class = 172 | 0) 0.178286 | 1) −0.344797 | 2) −0.102584 | 3) 2.978148 |
|---|---|---|---|---|
| 4) −0.846488 | 5) −0.377266 | 6) −1.016320 | 7) −0.147931 | 8) 0.946807 |
| 9) 0.637049 | 10) −0.059414 | 11) −0.385542 | 12) 1.616022 | 13) 0.610533 |
| 14) −0.793032 | 15) −2.641501 | 16) −1.049373 | 17) −1.068967 | 18) −0.432345 |
| 19) −1.366287 | 20) 0.454425 | 21) −0.772841 | 22) −0.508396 | 23) −3.569656 |
| 24) −0.925233 | 25) −1.171138 | 26) −0.729469 | 27) −0.863082 | 28) −2.121749 |
| 29) −0.530340 | 30) −1.349335 | 31) 0.631593 | 32) −1.590863 | 33) 0.293247 |

TABLE 4-continued

| | | | | |
|---|---|---|---|---|
| 34) 0.301449 | 35) −1.102518 | 36) 2.536645 | 37) −0.857060 | 38) 0.910959 |
| 39) −0.634729 | 40) 0.673855 | 41) 2.015574 | 42) −1.872863 | 43) 2.244940 |
| 44) −0.032440 | 45) 0.302931 | 46) −0.467586 | 47) −2.281095 | 48) −0.371902 |
| 49) 1.257950 | 50) 0.286894 | 51) −1.406989 | 52) −0.652696 | 53) 2.940878 |
| 54) −0.252965 | 55) 0.572471 | 56) −1.326871 | 57) 1.074839 | 58) 2.235821 |
| 59) −2.172594 | 60) −0.965628 | 61) −0.592294 | 62) −0.607612 | 63) 1.493880 |
| 64) 1.164531 | 65) −0.591862 | 66) 1.884218 | 67) 0.652909 | 68) 0.202682 |
| 69) 0.069958 | 70) −0.738007 | 71) 0.630822 | 72) 1.619237 | 73) 0.576088 |
| 74) 1.088421 | 75) −1.450519 | 76) 0.216925 | 77) −0.216482 | 78) −0.171313 |
| 79) −0.269077 | 80) −1.554032 | 81) −1.301268 | 82) −0.417947 | 83) −0.284829 |
| 84) −0.484241 | 85) 0.656799 | 86) −0.529562 | 87) 0.462294 | 88) −0.030099 |
| 89) −1.073554 | 90) 0.455738 | 91) 0.765644 | 92) 2.387839 | 93) −0.135393 |
| 94) 0.452002 | 95) −0.095516 | 96) −1.169036 | 97) 2.446636 | 98) 1.475803 |
| 99) −1.181951 | 100) 1.170773 | 101) −10.139621 | 102) 0.412165 | 103) 1.777497 |
| 104) −0.920773 | 105) 0.702809 | 106) 3.133031 | 107) 0.987483 | 108) −0.330089 |
| 109) 0.624065 | 110) −0.454779 | 111) 1.122200 | 112) 1.093183 | 113) −0.556197 |
| 114) 0.052047 | 115) −1.001559 | 116) 1.210458 | 117) −5.804389 | 118) 1.373737 |
| 119) −0.624629 | 120) −0.822579 | 121) −0.319095 | 122) 1.156417 | 123) 0.596179 |
| 124) 0.205900 | 125) −0.982200 | 126) −1.353985 | 127) −0.001600 | 128) −1.548887 |
| 129) 1.066706 | 130) −1.035700 | 131) 1.086801 | 132) 2.638659 | 133) 0.416939 |
| 134) −0.521977 | 135) 0.255500 | 136) 0.370065 | 137) −1.091864 | 138) 0.892251 |
| 139) 0.329177 | 140) −1.307151 | 141) −2.290542 | 142) −0.804392 | 143) −1.483630 |
| 144) 0.288155 | 145) −0.925689 | 146) 1.189871 | 147) −2.239467 | 148) −1.124793 |
| 149) −1.111712 | 150) −2.314448 | 151) −0.947446 | 152) 3.342898 | 153) 0.294681 |
| 154) −0.576349 | 155) 0.145284 | 156) −0.969348 | 157) −0.319233 | 158) −0.757430 |
| 159) −1.116678 | 160) −2.316203 | 161) 4.886127 | 162) 0.072159 | 163) 1.089378 |
| 164) −0.086970 | 165) −1.320221 | 166) −0.228987 | 167) −2.269567 | 168) 0.938402 |
| 169) −0.001634 | 170) 0.703678 | 171) −0.380549 | 172) 9.646190 | 173) −1.083567 |
| 174) 5.869316 | 175) 1.075665 | 176) 0.996995 | 177) −0.795732 | 178) −1.749942 |
| 179) 0.714268 | 180) 0.338471 | 181) −3.269484 | 182) 0.013805 | 183) −0.462269 |
| 184) −0.867856 | 185) −1.084840 | 186) −0.226411 | 187) 0.009548 | 188) −2.072074 |
| 189) −0.045695 | 190) −3.325969 | 191) 0.204061 | 192) −1.622849 | 193) 1.552601 |
| 194) 0.479624 | 195) 1.474854 | 196) −0.607320 | 197) −1.156920 | 198) 0.415504 |
| 199) −1.727610 | | | | |

An output by the first output device 208 of the vector representation system 200 is shown in TABLE 5 below for the "POS GRP DIM 172 REP "musschenbroek" (namely, the depiction of the positive (POS) group of dimension 172 with representative musschenbroek, a famous Dutch Physicist). TABLE 5 depicts the 40 highest items and the word with the highest cosine distance is faraday with 123 input sequence occurrences and dimension 172 value of 0.62 (all word vectors are normalized).

TABLE 5

| | | | |
|---|---|---|---|
| 123 faraday 0.624074) | 103 pasteur 0.590625) | 347 maxwell 0.562671) | 111 davy 0.529671) |
| 105 mendel 0.523212) | 275 crick 0.509822) | 109 chemists 0.503806) | 110 dinger 0.487024) |
| 803 newton 0.477267) | 179 planck 0.473483) | 1775 discovered 0.469755) | 651 experiments 0.448572) |
| 843 invented 0.443181) | 423 chemist 0.442352) | 669 einstein 0.438594) | 750 experiment 0.429419) |
| 1071 discovery 0.427577) | 121 abel 0.427071) | 101 thomson 0.425058) | 596 laboratory 0.410209) |
| 133 patented 0.402767) | 1492 physics 0.398097) | 358 watson 0.390788) | 282 discoveries 0.386280) |
| 143 babbage 0.386049) | 219 physicists 0.382466) | 377 galileo 0.376587) | 146 researcher 0.374028) |
| 146 watt 0.373522) | 111 bohr 0.370671) | 217 devised 0.365083) | 106 napier 0.362530) |
| 116 fermi 0.359409) | 762 physicist 0.352844) | 116 edison 0.323912) | 636 scientist 0.321781) |
| 144 inventions 0.321463) | 501 invention 0.319657) | 960 chemistry 0.313779) | 619 experimental 0.313625) |
| 738 mathematician 0.297322) | 102 hubble 0.290183) | 150 clerk 0.273526) | 615 researchers 0.273381) |

Figure 3:
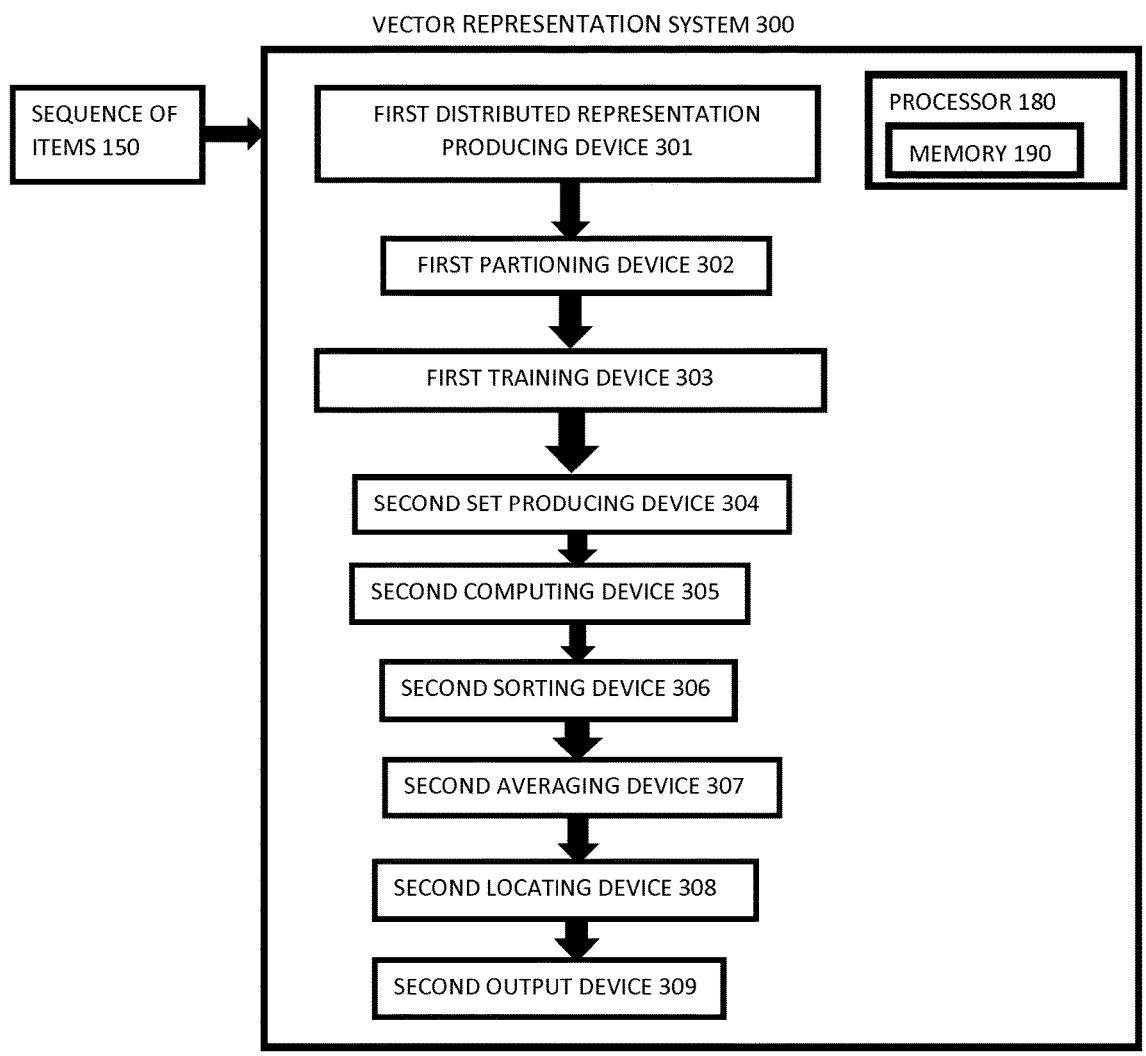
FIG. 3 exemplarily shows a block diagram illustrating a configuration of a vector representation system 300.

With reference now to FIG. 3, the vector representation system 300 includes a first distributed representation device 301, a first partitioning device 302, a first training device 303, a second set producing device 304, a second computing device 305, a second sorting device 306, a second average device 307, a second locating device 308, and a second output device 308. The vector representation system 300 receives a sequence of items 150 as an input. The vector representation system 300 includes a processor 180 and a memory 190, with the memory 190 storing instructions to cause the processor 180 to execute each device of the vector representation system 300.

The first distributed representation device 301, the first partitioning device 302, the first training device 303, the second set producing device 304, the second sorting device 306, the second average device 307, the second locating device 308, and the second output device 308 perform the same functions as their numerical counterparts in the vector representation system 200 described above.

However, when explaining dimensions for a specific item I, the second computing device 305 computes a cosine distance of the word vector for item "I" and each word vector produced by the second set producing device 304 and then the second sorting device 306 sorts the results from high to low.

That is, the second computing device 305 computes the cosine distance of the word vector for an item, the specific one whose vector entries that is desired to be explained, and each word vector of the set produced by the second set producing device 304. This way the explanation is geared towards the specific item.

A difference between the vector representation system 200 and vector representation system 300 is that vector representation system computes the average of a set of vectors that are determined by their closeness to I rather than just by their values for the i'th dimension.

Figure 4:
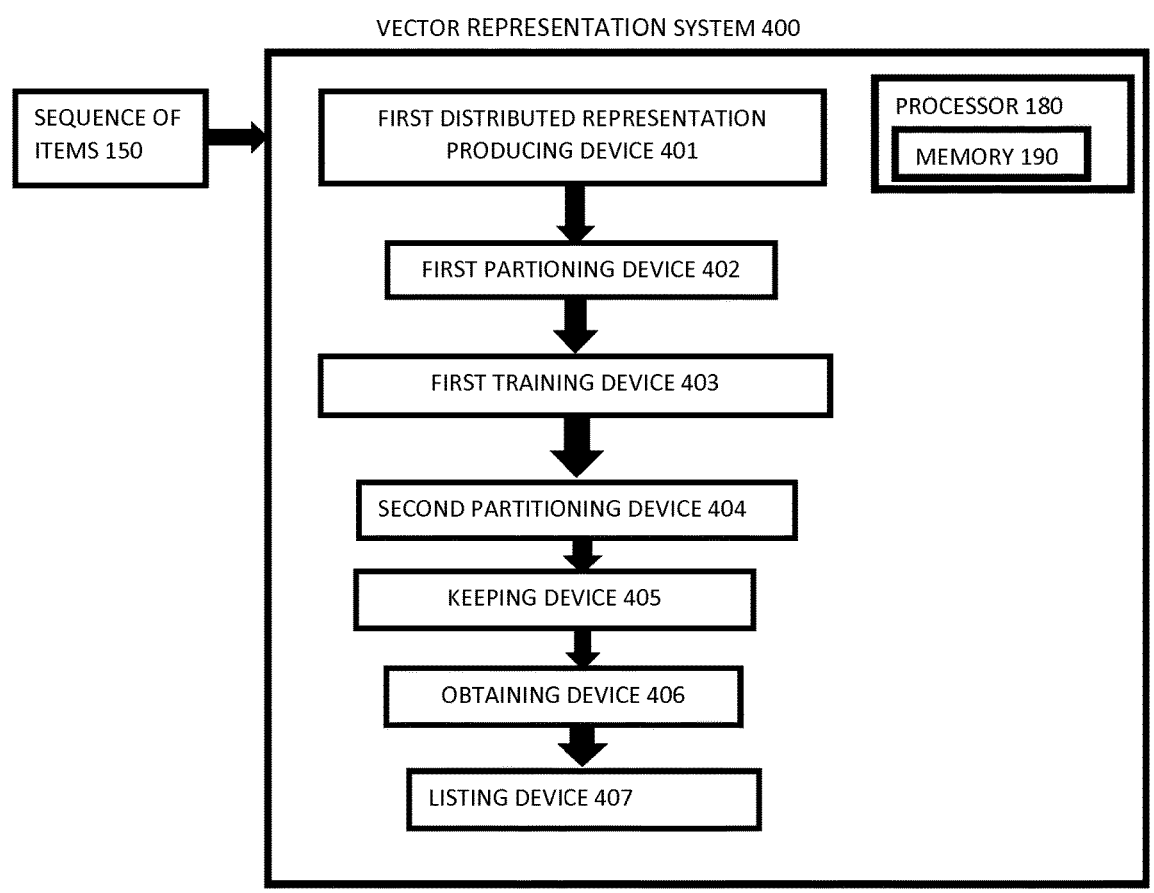
FIG. 4 exemplarily shows a block diagram illustrating a configuration of a vector representation system 400.

With reference now to FIG. 4, the vector representation system 400 includes a first distributed representation device 401, a first partitioning device 402, a first training device 403, a second partitioning device 404, a keeping device 405, an obtaining device 406, and a listing device 407. The vector representation system 400 receives a sequence of items 150 as an input. The vector representation system 400 includes a processor 180 and a memory 190, with the memory 190 storing instructions to cause the processor 180 to execute each device of the vector representation system 400.

The first distributed representation device 401, the first partitioning device 402, and the first training device 403 perform the same functions as the first distributed representation device 101, a first partitioning device 102, a first training device 103 described above.

After the first training device 403 trains the vectors, the second partition device 404 partitions items into classes based on their word vectors. The numbering of the classes is C1 to Cm. In other words, following the first training device 403, the second partition device 404 clusters the items word vectors and produces "m" classes C1 to Cm.

The keeping device 405, for each class Ci, keeps a word representative vector ci. With each class Ci, the keeping device 405 keeps a representative vector ci, derived from the class word vectors. Representatives of a class are produced by adding all the vectors in the class and producing a sum vector and normalizing the sum vector by dividing it by its length. The meaning of a dimension "i" following the second phase training is provided by listing dominant items (in terms of their closeness to the dimension (i.e., class) representative).

The obtaining device 406 obtains dominant words for dimension "i". The obtaining device 406 obtains the dominant words based on the words in Ci with the highest cosine distance to ci.

The listing device 407 lists the dominant words output from the obtaining device 406 to explain dimension "i".

Figure 5:
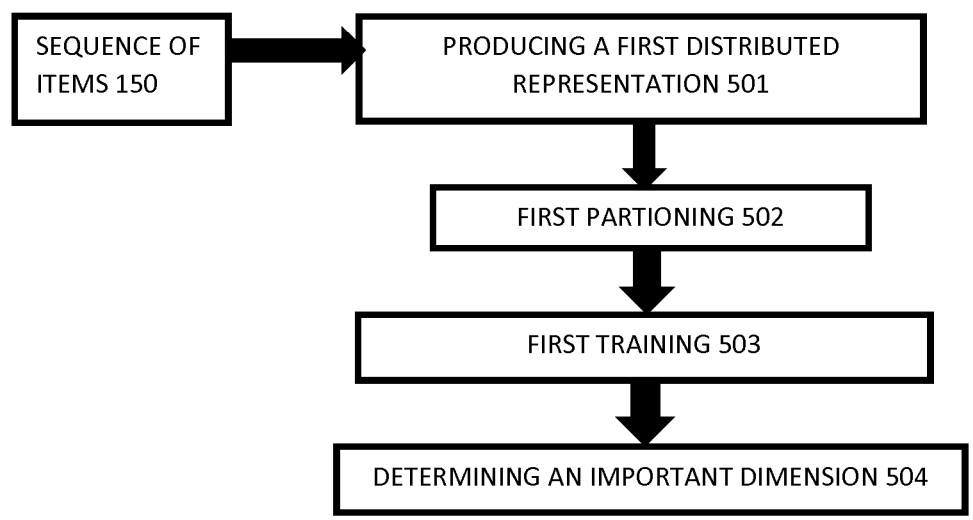
FIG. 5 exemplarily shows a high level flow chart for a vector representation method 500.

FIG. 5 shows a high level flow chart for a vector representation method 500.

Step 501 receives the sequence of items 150 and produces a distributed representation for each item "w", a word vector and a context vector. That is, step 501 uses a vector producing algorithm such as word2vec (w2v) or Glove, and produces output vectors of two types per each item: word (Syn0 type in w2v) and context (Syn1neg in w2v)).

Step 502 partitions the items into classes. For each class "C", step 502 keeps a word representative vector "c" and a context representative vector "c".

Step 503 trains from scratch on the input sequence where the newly learned vectors are of dimension m, the number of classes in step 502. Step 503 produces a new distributed representation by amplifying by a factor greater than one the changes to vector dimensions corresponding to class of word and fractionally, a factor bigger than zero and less than one, those that do not. In this way, each dimension uniquely corresponds to a class.

Step 504 determines an important dimension and outputs the positive (POS) and negative (NEG) items associated with the dominant dimensions. For example, step 504 outputs the items associated with the dominant dimensions 184, 195, 104 and 73 for ship. The positive group dimensions of class 184 are output by step 504 and shown in TABLE 2 above and the negative group dimensions of class 184 are output by step 504 and shown in TABLE 3 above.

Figure 6:
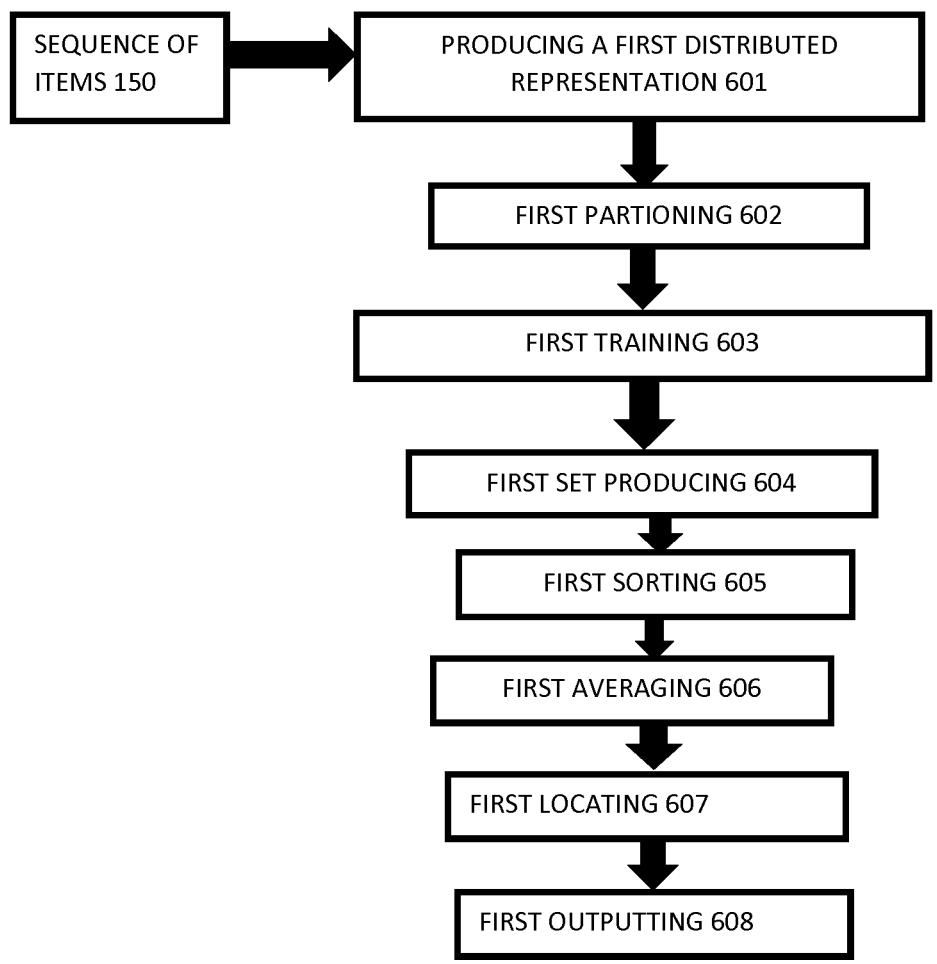
FIG. 6 exemplarily shows a high level flow chart for a vector representation method 600.

FIG. 6 shows a high level flow chart for a vector representation method 600.

Steps 601, 602, and 603 perform the same functions as the numerical counterparts in the vector representation method 500 described above.

For each dimension "i", step 604 produces sets Si1 and Si2. Set Si1 includes positive vector entries and set Si2 includes negative vector entries as follows.

Step 605 sorts all word vectors according to all positive entries value (+) in dimension i as T. Step 605 retains the first L vectors of (the highest L values) in the sort order (L is a parameter, e.g., 40) and the corresponding set of items is Si1.

Step 606 calculates the average vector for Si1 and normalizes it to have length 1, by summing up the word vectors of the items in T and normalizing the resulting vector by dividing it by its length. Step 606 sets $AVG_{i1}$ be the resulting vector.

Step 607 locates the vocabulary word whose word vector is cosine distance highest with $AVG_{i1}$. The word represents Si1.

In other words, step 607 calculates the representative item and vector for Si1 by locating the item w in the vocabulary whose word vector vw (Syn0 type vector in w2v) has the highest cosine distance with $AVG_{i1}$.

Step 608 outputs a vector representation as shown in TABLE 5 above for the "POS GRP DIM 172 REP "musschenbroek". TABLE 5 depicts the 40 highest words and the word with the highest cosine distance is faraday.

Figure 7:
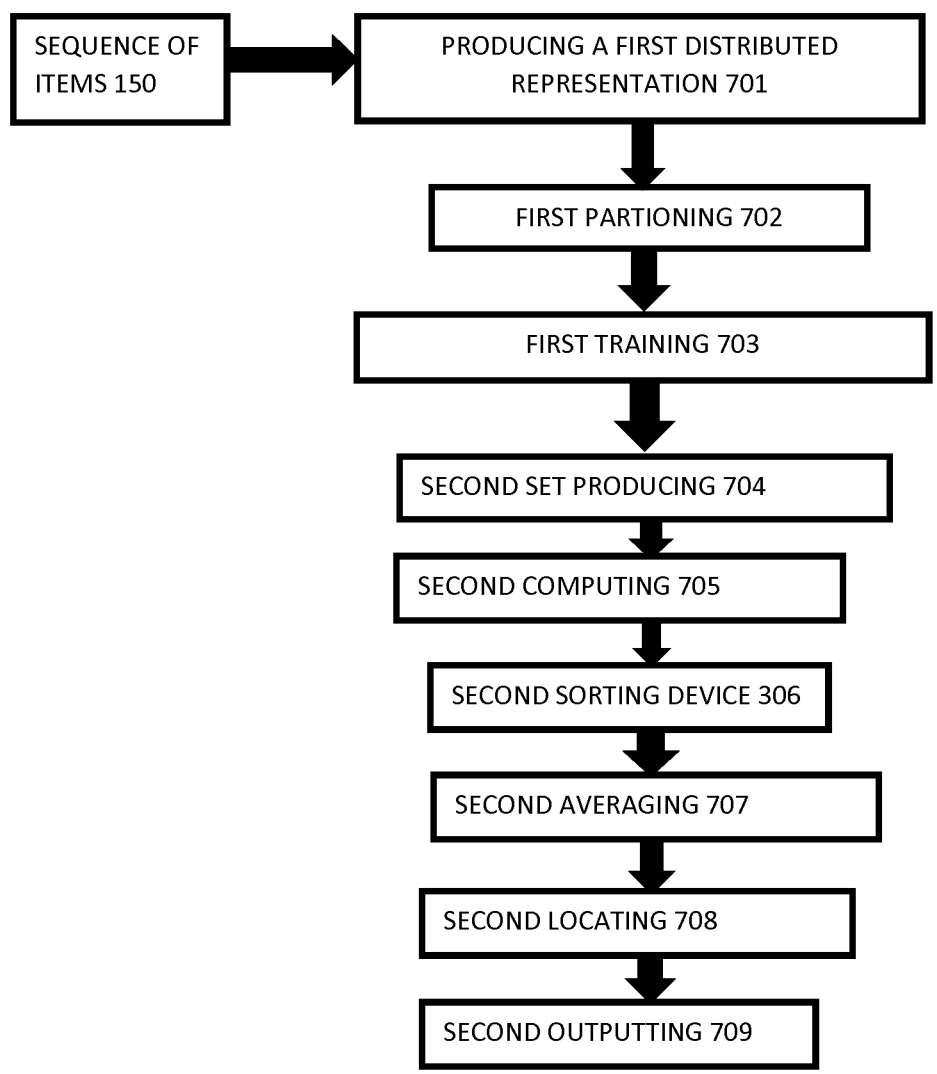
FIG. 7 exemplarily shows a high level flow chart for a vector representation method 700.

FIG. 7 shows a high level flow chart for a vector representation method 700.

Step 701, step 702, step 703, step 704, step 706, step 707, step 708, and step 709 perform the same functions as in the vector representation method 600 described above.

However, step 705 computes the cosine distance of word vector for item i and each word vector produced by step 704 and step 706 sorts the results from high to low.

That is, step 705 computes the cosine distance of the word vector for item, the one whose vector entries that is desired to be explained, and each word vector of the set produced by step 704.

A difference between the vector representation method 600 and vector representation method 700 is that vector representation method computes the average of a set of vectors that are determined by their closeness to w rather than just by their values for the i'th dimension.

Figure 8:
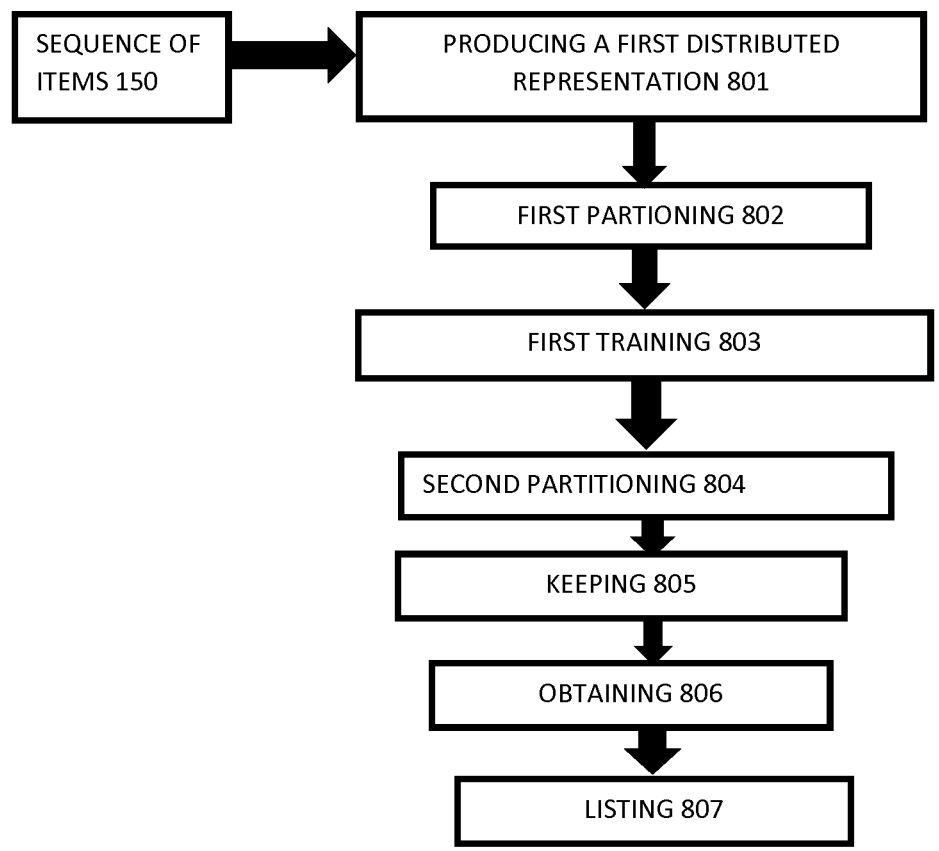
FIG. 8 exemplarily shows a high level flow chart for a vector representation method 800.

FIG. 8 shows a high level flow chart for a vector representation method 800.

Step 801, step 802, and step 803 perform the same functions as step 701, step 702, and step 703 described above in the vector representation method 700.

After step 803 trains the vector representation method 800, step 804 partitions items into classes based on their context vectors. The number of the classes are C1 to Cm. In other words, following step 803, step 804 clusters the items word vectors and produce m classes C1 to Cm.

For each class Ci, step 805 keeps a word representative vector ci. With each class Ci, step 805 keeps a representative vector ci, derived from the class word vectors. Representatives of a class are produced by adding all the vectors in the class and produce a sum vector and normalized the sum vector by dividing it by its length. The meaning of a dimension i following the second phase training is provided by listing dominant items (in terms of their closeness to the dimension (i.e., class) representative).

Step 806 obtains dominant words for dimension i. The obtaining device 806 obtains the dominant words based on the words in Ci with the highest cosine distance to ci.

Step 807 lists the dominant words output from step 806 to explain dimension "i".

In view of the foregoing and other problems, disadvantages, and drawbacks of the aforementioned conventional art, an exemplary aspect of the disclosed invention provides a system, method, and non-transitory recording medium for vector representation of words which can provide a technical solution to the technical problem in the conventional approaches by forcing meaning on dimensions, and, following training so as to observe the entries for a particular dominant dimension and deduce a semantic meaning for this word on this dominant dimension.

Exemplary Hardware Aspects, Using a Cloud Computing Environment

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 13, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 10, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the vector representation systems 100, 200, 300, and 400 described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A method for vector representation of a sequence of items, the method comprising:
   receiving a sequence of items from a source;
   producing a first distributed representation for each item of the sequence, wherein the first distributed representation comprises a word vector and a class vector;
   partitioning the sequence of items into classes; and
   training the received sequence using the first distributed representation, such that a new distributed representation is produced for which the vector entries of the new distributed representation are amplified to create dominant dimensions for when the vector entries of each item correspond to a class of an item to be explained and fractionalizing vector entries of each item that do not correspond to the class of the item to be explained such that the dominant dimensions correspond to higher absolute value entries than the fractionalized vector entries in order to emphasize the dominant dimensions,
   wherein the amplifying the vector entries is performed by multiplying the vector entries by a factor greater than one, and
   wherein the fractionalizing the vector entries is performed by multiplying the vector entries by a factor greater than zero and less than one,
   further comprising:
      after the training:
         partitioning the items in the vector entries into classes based on their word vectors;
         for each class of the classes, keeping a word representative vector derived from the classes;
         obtaining dominant words based on the words in the classes with a highest cosine distance to the word representative vector;
         listing the dominant words output from the obtaining to explain the vector entries; and
         creating an output data file with the dominant words.

2. The method of claim 1, further comprising:
   for the item to be explained for each dimension, producing a first set of items of whose word vector entries for the dimension include positive integers and a second set of items of whose vector entries for the dimension include negative integers;
   sorting each set of items according to the absolute values from a highest value to a lowest value of the entries of the word vectors for the dimension and retaining a predetermined number of the vectors corresponding to the highest value;
   for each set, calculating an average vector for the first set of word vectors and normalizing the average vector to have a length of one; and
   locating an item for which the word vector has a cosine distance highest from the average vector as representative of a set.

3. The method of claim 2, wherein the positive items are relevant for explaining the item if the dimension entry is the positive integer in the word vector of the item following the training, and
   wherein the negative items are relevant if the dimension entry is the negative integer in the word vector of the item following the training.

4. The method of claim 1, further comprising:
   determining a dimension and outputting positive group items and negative group items associated with the dimension.

5. The method of claim 1, further comprising:
   partitioning items into classes based on the word vector;
   for each class, keeping a word representative vector; and
   obtaining dominant items based on the items in each class with a highest cosine distance to the word representative vector.

6. The method of claim 1, wherein after the producing, an absolute value of the largest vector dimension comprises the dominant dimension.

7. A non-transitory computer-readable recording medium recording a vector representation program for vector representation of a sequence of items, the program causing a computer to perform:
   receiving a sequence of items from a source;

producing a first distributed representation for each item of the sequence, wherein the first distributed representation comprises a word vector and a class vector;

partitioning the sequence of items into classes; and training the received sequence using the first distributed representation, such that a new distributed representation is produced for which the vector entries of the new distributed representation are amplified to create dominant dimensions for when the vector entries of each item correspond to a class of an item to be explained and fractionalizing vector entries of each item that do not correspond to the class of the item to be explained such that the dominant dimensions correspond to higher absolute value entries than the fractionalized vector entries in order to emphasize the dominant dimensions, wherein the amplifying the vector entries is performed by multiplying the vector entries by a factor greater than one, and wherein the fractionalizing the vector entries is performed by multiplying the vector entries by a factor greater than zero and less than one, further comprising:
after the training:
partitioning the items in the vector entries into classes based on their word vectors;
for each class of the classes, keeping a word representative vector derived from the classes;
obtaining dominant words based on the words in the classes with a highest cosine distance to the word representative vector;
listing the dominant words output from the obtaining to explain the vector entries; and
creating an output data file with, the dominant words.

8. The non-transitory computer-readable recording medium of claim 7, further comprising:
for the item to be explained for each dimension, producing a first set of items of whose word vector entries for the dimension include positive integers and a second set of items of whose vector entries for the dimension include negative integers;
sorting each set of items according to the absolute values from a highest value to a lowest value of the entries of the word vectors for the dimension and retaining a predetermined number of the vectors corresponding to the highest value;
for each set, calculating an average vector for the first set of word vectors and normalizing the average vector to have a length of one; and
locating an item for which the word vector has a cosine distance highest from the average vector as representative of a set.

9. The non-transitory computer-readable recording medium of claim 8, wherein the positive items are relevant for explaining the item if the dimension entry is the positive integer in the word vector of the item following the training, and
wherein the negative items are relevant if the dimension entry is the negative integer in the word vector of the item following the training.

10. The non-transitory computer-readable recording medium of claim 7, further comprising:
determining a dimension and outputting positive group items and negative group items associated with the dimension.

11. The non-transitory computer-readable recording medium of claim 7, further comprising:

partitioning items into classes based on the word vector;
for each class, keeping a word representative vector; and
obtaining dominant items based on the items in each class with a highest cosine distance to the word representative vector.

12. The non-transitory computer-readable recording medium of claim 7, wherein after the producing, an absolute value of the largest vector dimension comprises the dominant dimension.

13. A vector representation system for vector representation of a sequence of items, the system receiving the sequence of items from a source, the system comprising:
a first distributed representation device configured to produce a first distributed representation for each item of the sequence, the first distributed representation including a word vector and a class vector;
a first partitioning device configured to partition the sequence of items into classes; and
a first training device configured to train the received sequence using the first distributed representation, such that a new distributed representation is produced for which the vector entries of the new distributed representation are amplified to create dominant dimensions for when the vector entries of each item correspond to a class of an item to be explained and fractionalizing vector entries of each item that do not correspond to the class of the item to be explained such that the dominant dimensions correspond to higher absolute value entries than the fractionalized vector entries in order to emphasize the dominant dimensions,
wherein the amplifying the vector entries is performed by multiplying the vector entries by a factor greater than one, and
wherein the fractionalizing the vector entries is performed by multiplying the vector entries by a factor greater than zero and less than one,
further comprising:
after the training:
partitioning the items in the vector entries into classes based on their word vectors;
for each class of the classes, keeping a word representative vector derived from the classes;
obtaining dominant words based on the words in the classes with a highest cosine distance to the word representative vector;
listing the dominant words output from the obtaining to explain the vector entries; and
creating an output data file with the dominant words.

14. The system of claim 13, further comprising:
for the item to be explained for each dimension, a first set producing device configured to produce a first set of items of whose word vector entries for the dimension are positive and a second set of items of whose vector entries for the dimension are negative;
a first sorting device configured to sort each set of items according to the absolute values from a highest value to a lowest value of the entries of the word vectors for the dimension and retaining a predetermined number of the vectors corresponding to the highest value;
a first averaging device configured to calculate, for each set, an average vector for the first set of word vectors and normalizing the average vector to have a length of one; and
a first locating device configured to locate an item for which the word vector has a cosine distance highest from the average vector as representative of a set.

15. The system of claim 14, wherein the positive items are relevant for explaining the item if the dimension entry is positive in the word vector of the item following the training, and wherein the negative items are relevant if the dimension entry is negative in the word vector of the item following the training.

16. The system of claim 13, further comprising:

a first output device configured to output a dimension for positive group items and negative group items associated with the dimension.

17. The system of claim 13, wherein after the producing, an absolute value of the largest vector dimension comprises the dominant dimension.

18. The method of claim 1, wherein the amplifying emphasizes the vector entries as higher values in comparison to the vector entries fractionalized by the fractionalizing to distinguish between preferred and non-preferred values of the vector entries.

19. The method of claim 1, wherein the word representative vector of a class is produced by adding all the vectors in the class and producing a sum vector and normalizing the sum vector by dividing the sum vector by its length.

* * * * *